May 25, 1965 V. R. AGNEW 3,185,277
PNEUMATIC DIVIDER AND DISTRIBUTOR
Filed Aug. 4, 1961 7 Sheets-Sheet 1

INVENTOR.
VINCENT R. AGNEW
BY George B. White
ATTORNEY

INVENTOR.
VINCENT R. AGNEW
BY George B. White
ATTORNEY

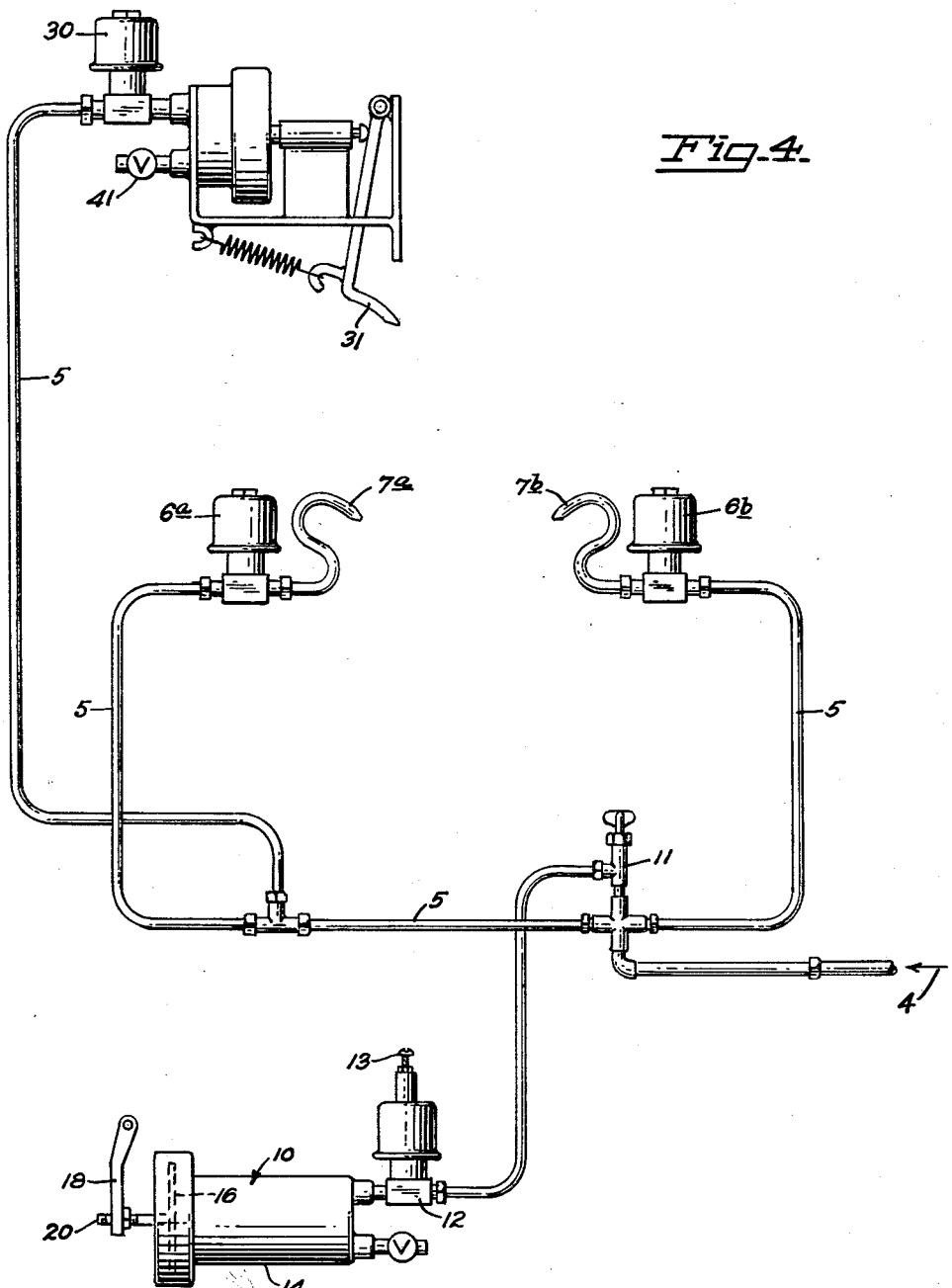

INVENTOR.
VINCENT R. AGNEW
BY George B. White
ATTORNEY

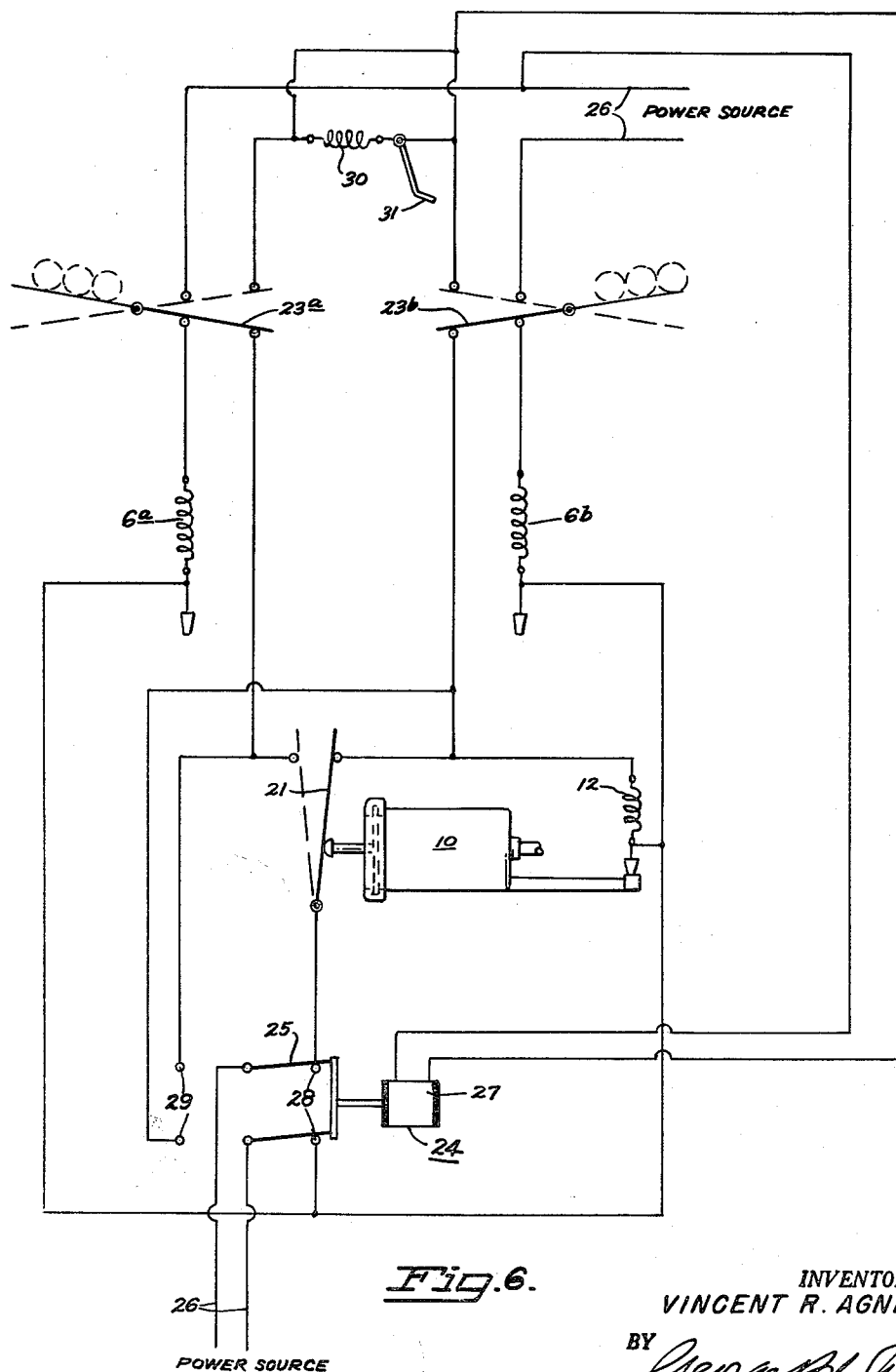

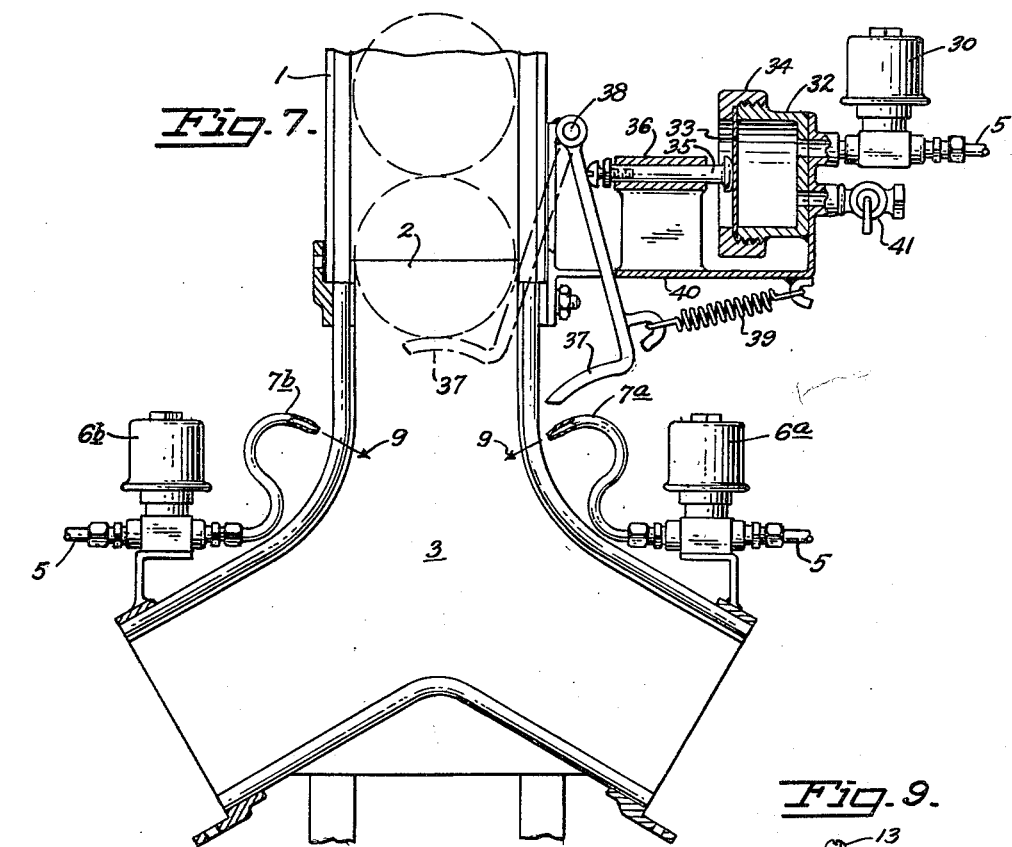
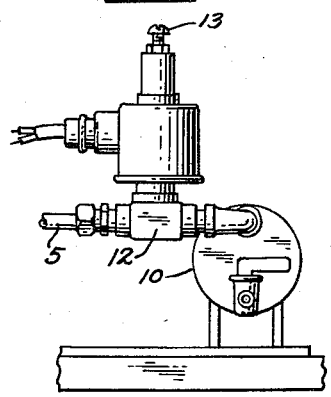
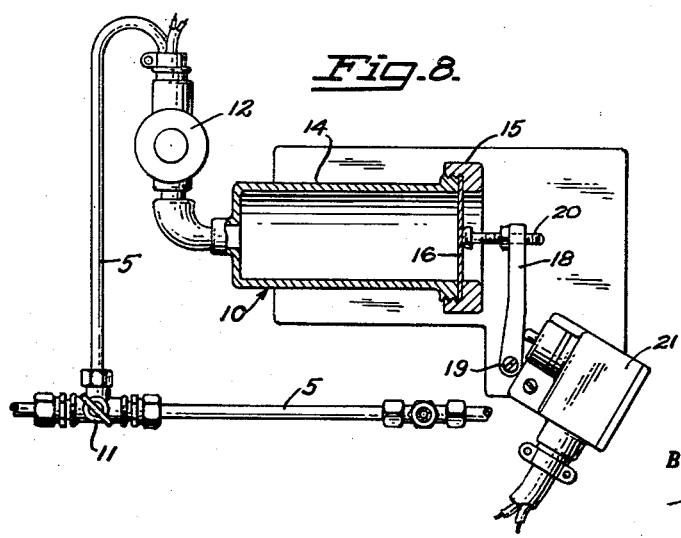

3,185,277
PNEUMATIC DIVIDER AND DISTRIBUTOR
Vincent R. Agnew, 816 El Vecino, Modesto, Calif.
Filed Aug. 4, 1961, Ser. No. 129,456
6 Claims. (Cl. 193—31)

My invention relates to a method and apparatus for diverting, dividing and distributing the flow of cans, containers, or similar objects in the course of their flow through the continuous line of a processing, filling or canning plant by the use of pneumatic jets in combination with electro-mechanical and electro-pneumatic devices.

In the processing and packaging industries in which containers of various types are handled in a continuous flow through chutes or conveyors on their way to machinery, such as automatic fillers of various kinds, a problem is encountered in satisfactorily diverting and dividing the flow of containers from a single line and distributing them to two or more branches, while maintaining a flow corresponding to the requirements of the process. This problem is aggravated by the fact that the rate of flow in such branch lines is not always equal or uniform and the sum of the flow in all the branch lines may at times be less than the flow in the main supply or feeder conveyor, or the flow in one or more branch lines may be completely interrupted for a period of time.

A number of devices have been utilized to solve this problem. These have taken the form of mechanical stops or swinging gates, cams, eccentrics, and pushers, or mechanical diverters of various types. Some of these have been electromagnetically actuated and interlocked in various ways.

None of the methods or devices heretofore in use are completely satisfactory, since they are generally unreliable in operation resulting in frequent denting and smashing of the containers, as well as shut-downs and delays to the production operations. Most existing devices are positive in action and hence inflexible. They are consequently subject to excessive wear, breakage and high maintenance and, in the case of cans, contribute greatly to the noise of the operations. They have a tendency also to mar and otherwise deface the surfaces of the containers.

It is, therefore, an object of my invention to provide an improved apparatus and method for automatically dividing the flow of a single line of containers into two or more lines.

It is another object of my invention to provide an apparatus and method for dividing the flow of containers in a processing or packaging line which would be reliable and smooth in operation.

It is yet another object of my invention to provide an apparatus and method for diverting and dividing the flow of cans and similar containers which is relatively quiet in operation and minimizes marring and defacing of the containers.

It is a more specific object of my invention to provide an apparatus and method for diverting and dividing the flow of cans and similar containers by utilizing a pneumatic jet.

It is another specific object of my invention to provide an apparatus and method for diverting and dividing the flow of cans and similar containers by utilizing solenoid operated air valves to direct streams of air across the path of such containers to divert their flow and to direct them into branches as required by the process.

It is also an important object of my invention to provide an improved apparatus and method for stopping and starting the flow of cans and similar containers in a processing line whenever the process so requires.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

FIG. 4 is a diagrammatic representation of the air system of my invention.

FIG. 6 is a preferred electrical wiring diagram.

FIG. 7 is an enlarged longitudinal section showing the can stop gate mechanism of my invention.

FIG. 8 is an enlarged cross-sectional view of the arrangement of the alternator of my invention.

FIG. 9 is an end view of the alternator of FIG. 8.

Figure 1:
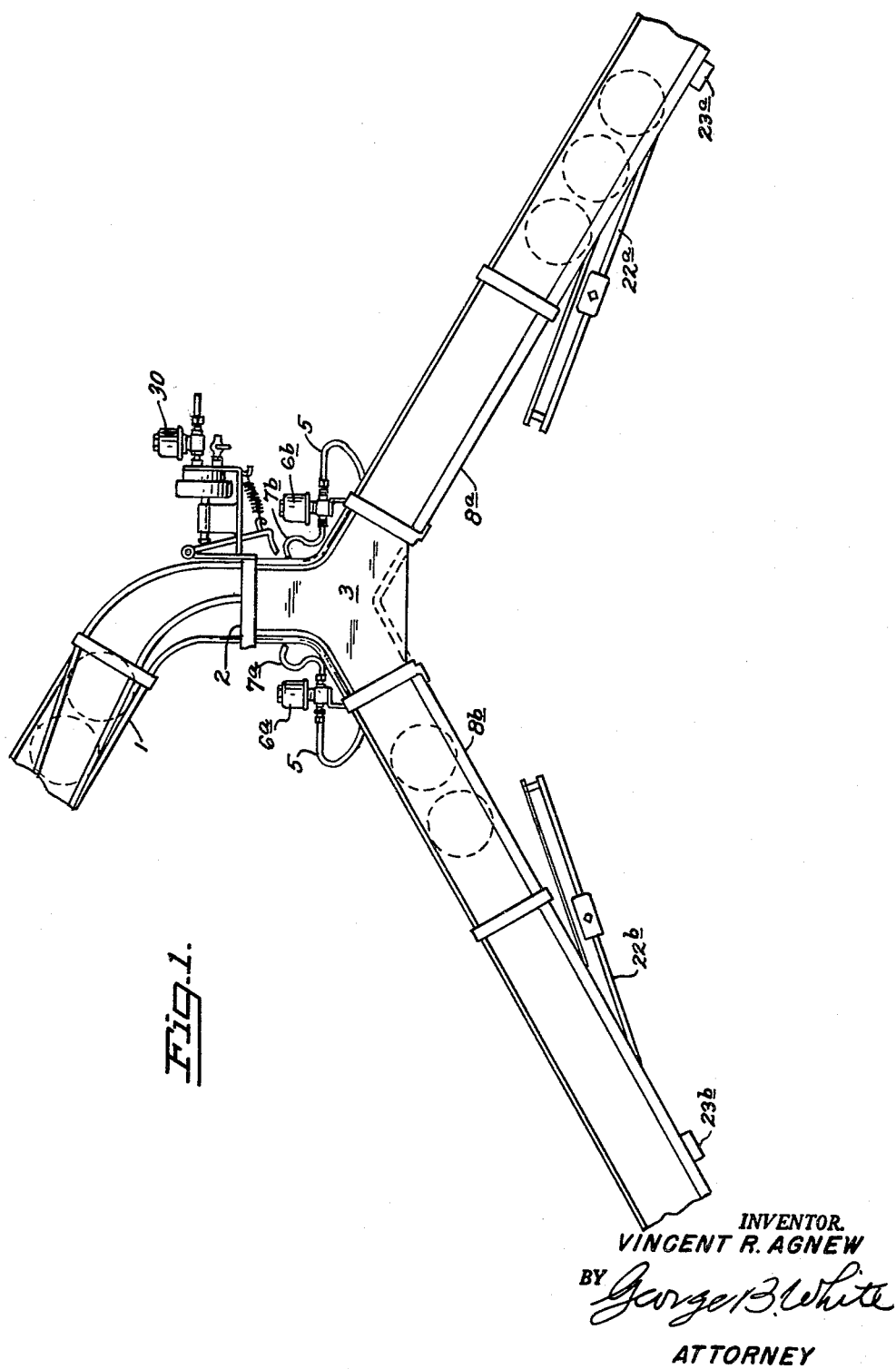
FIG. 1 is a schematic perspective view showing the general arrangement of my invention.

Referring now to the figures in each of which corresponding parts bear like numbers and especially now to FIG. 1, the main can feed conveyor or gravity runway is shown at 1 from which the cans feed into the mouth 2 of an inverted Y-shaped divider chute 3. Where the layout of the plant requires it, the cans may be turned so that they enter the divider chute in the proper plane by means of a turning or twisting section, comprising a series of guides of generally helical configuration which form a part of the conveyor and which is well known to those skilled in the art. In the divider chute the cans are diverted to as many branch chutes or runways as the plant layout requires automatically and efficiently and without any of the difficulties encountered with other means now in use as will be evident from a study of the other figures, together with FIG. 1.

The underlying principle of my invention is to provide a pneumatic jet or a series of jets so synchronized and arranged with relation to the rest of the plant operation as to effect any desired distribution of the cans.

Figure 3:
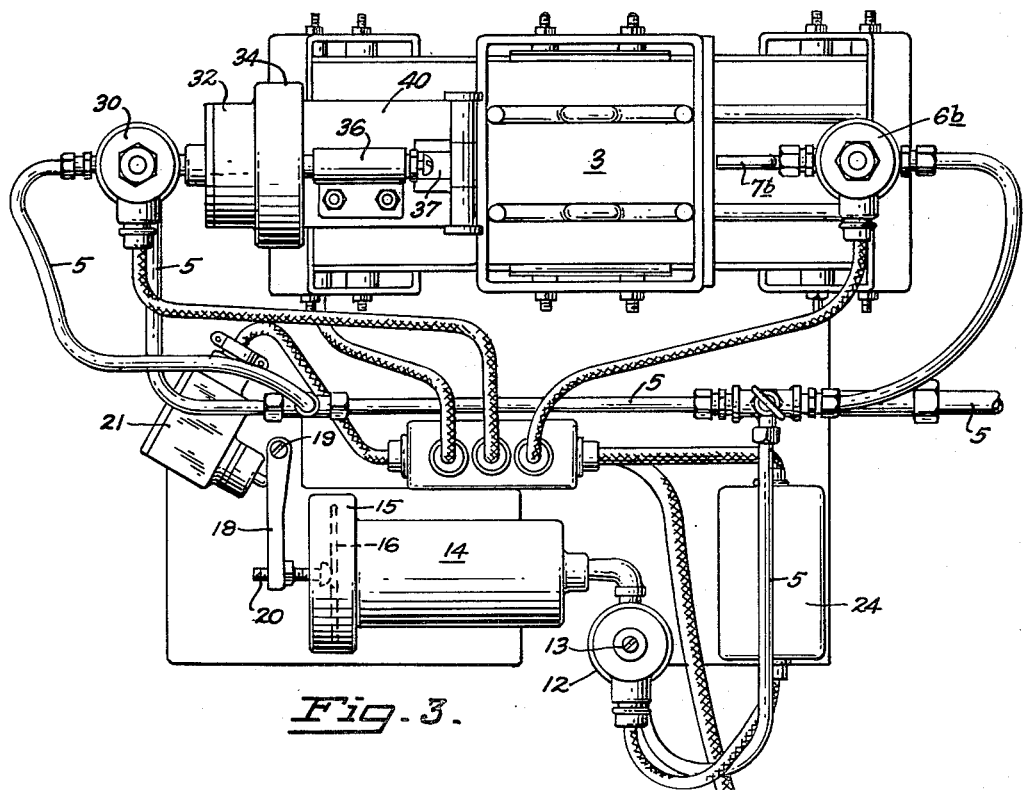
FIG. 3 is a plan view of my divider chute looking down through the inlet opening or mouth.
Figure 5:
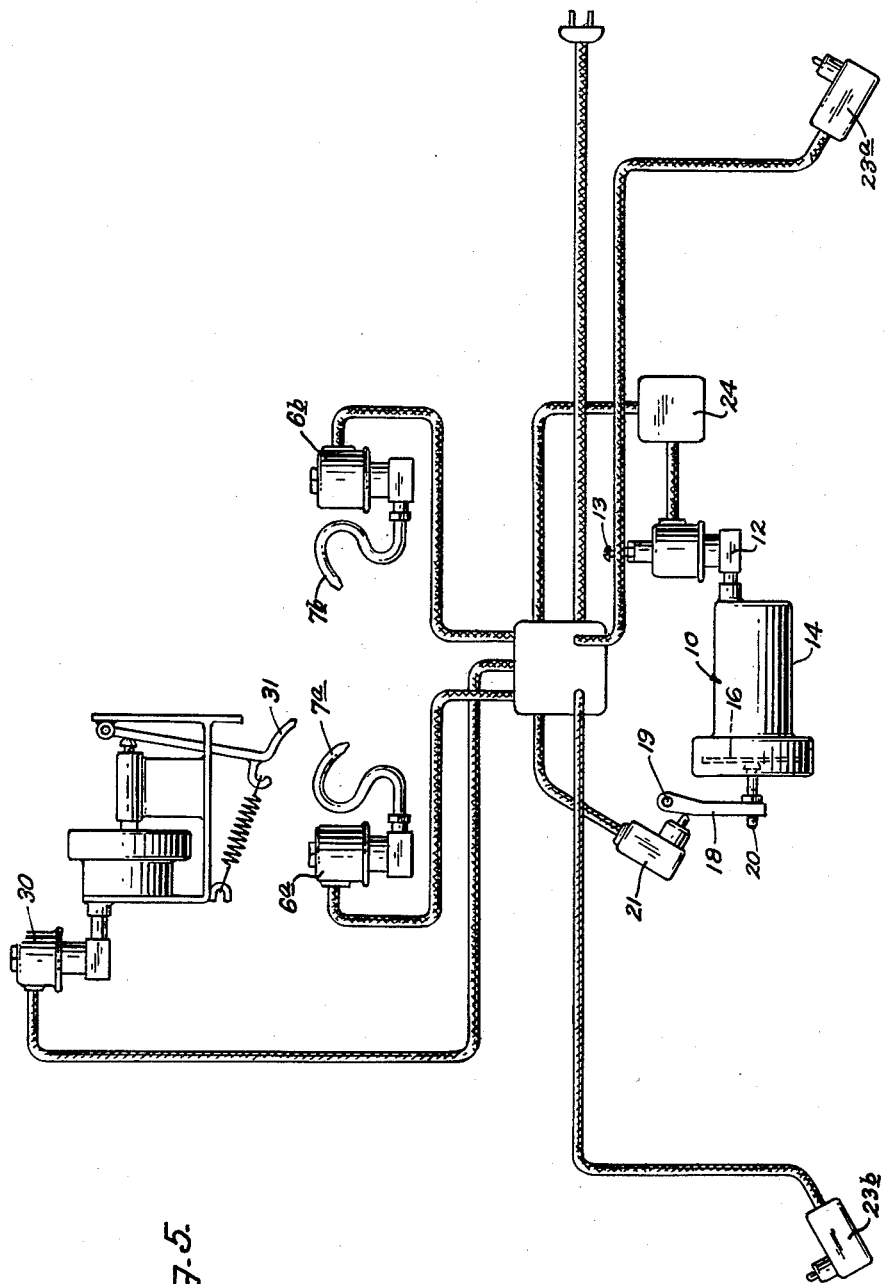
FIG. 5 is a digrammatic representation of the electrical system of my invention.
Figure 10:
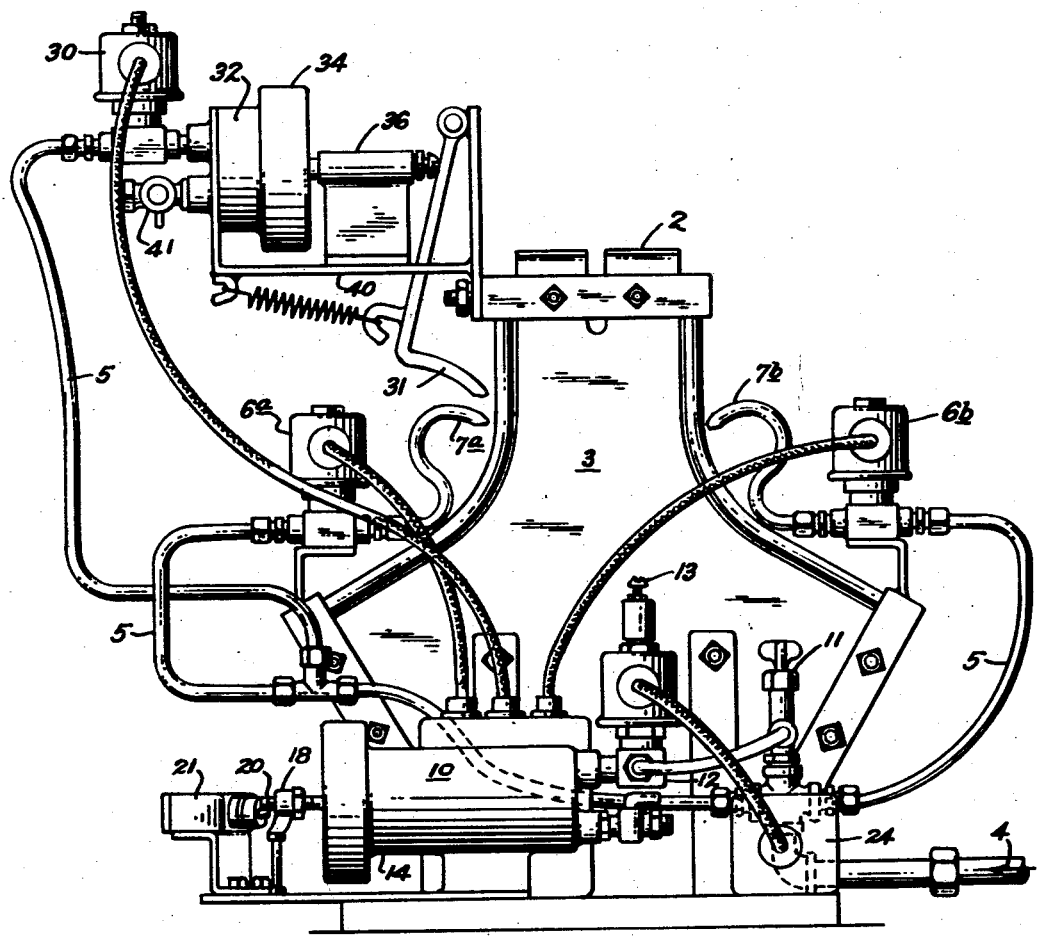
FIG. 10 is an enlarged elevation of my divider chute.

Thus in the embodiment of FIGS. 1, 3 and 10 and the accompanying explanatory diagrams of FIGS. 4, 5 and 6, there is a main supply of compressed air 4 at any convenient pressure, such as fifty pounds per square inch, which is distributed to the various components of my invention through air lines 5 as is best seen in FIG. 4. Two main branches thus lead directly to each of two solenoid operated air valves 6a and 6b positioned on opposite sides of the inlet opening 2 of divider chute 3. In the two branch arrangement illustrated herein I use the letter "a" to denote operating elements on one branch and the letter "b" to denote corresponding elements on the opposite branch. The discharge from valves 6a and 6b lead respectively to nozzle pipes 7a and 7b which are arranged to direct a flat stream or jet of air alternately in the direction of each of the lower outlet openings of divider chute 3 which lead directly to each of the branch chutes 8a and 8b, as shown diagrammatically at 9 of FIG. 7. This stream, or jet of air, has the double and combined effect on the cans of providing a barrier or gate against the flow of cans in one direction, while at the same time providing a cushion or conveyor on which the cans are caused to float or ride in another direction. The tremendous advantages of this will be at once apparent to those skilled in the art and especially as more fully brought later herein.

In order to effect the alternate diversion of the flow of cans and to coordinate and synchronize this with the plant operations, I use an unusual interlocking of the operations of my air system of FIG. 4 with my electrical system shown diagrammatically in relation to the components of my invention in FIG. 5. A preferred electrical wiring diagram is shown in FIG. 6.

The alternate turning on and off of the jet 7a and 7b is accomplished mainly through the operation of the alternator 10 which is shown in more detail in FIGS. 8 and 9. It comprises an air supply through one of the air lines 5 and a manually operated throttle or regulating valve 11 to solenoid valve 12, the latter being equipped with an exhaust port and exhaust port regulating valve 13. The main body of the alternator comprises an air tank or receiver 14 equipped with flanged end nut 15 and diaphragm 16. The movement of diaphragm 16 is transmitted to lever 18 which rides on pivot 19 by means of adjustable link 20 to a single pole double throw microswitch 21. The latter energizes the solenoids of valves 6a and 6b alternately to produce the alternating jet streams, as will now be more fully described.

The solenoid of valve 12 and the micro-switch 21 are connected in series with each other and with the main power supply which may be any convenient type, such as 110 volt A.C. or D.C. as seen in FIG. 6. The solenoids of valves 6a and b are each connected in series with the main power supply and each to opposite poles of microswitch 21.

The normal idle position of diaphragm 16 when the pressure is off of tank 14 is such as to throw micro-switch 21 in the position of energizing solenoids of valves 6b and 12. These valves are thus opened, jet 7b operates to divert cans to branch chute 8b and air enters tank 14. Pressure builds up until diaphragm 16, acting through the above described linkage throws microswitch 21 to the opposite pole, thereby energizing the solenoid of valve 6a and deenergizing the solenoid of valve 12. Jet 7a then operates to divert cans to branch chute 8a and since valve 12 is closed, air escapes through port 13, pressure is reduced in tank 14 until diaphragm 16 returns to its original position thereby throwing micro-switch 21 back to its original position and the cycle is repeated. The interval or period of the cycle is adjusted according to the needs of the process and plant layout by manually setting the rate of air flow in and out of tank 14 by means of valves 11 and 13.

A very important feature of my invention is the provision I make for taking care of the situation when there is an excess of cans in one of the branch chutes due to delay or stoppage of flow to that side of the process for some reason or other. Referring again specially to FIG. 1, there is seen provided in each of the branch chutes 8a and 8b, balance beams 22a and 22b, respectively, which in turn operate micro-switches 23a and 23b. An excess of cans backing up in either chute thus depresses the balance beam 22a or b and operates the micro-switch 23a or b. This may be a double pole double throw type of switch connected as shown in FIG. 6. Its operation is thus to break the circuit which feeds the solenoid valve located on the opposite side of the divider chute and which operates the air jet supplying its respective branch chute. The operation of micro-switches 23 acts further to close another circuit for reasons brought out below. Of course, for this purpose I may use any other detector means which would be responsive to an excess flow of cans, besides the beam and micro-switch arrangement herein disclosed.

Having thus cut off the air jet to one of the branch chutes, it is necessary to provide continuous flow to the other chute. This is accomplished by the operation of the master control relay 24 operating a double throw switch 25 connected as shown in FIG. 6. This relay controls the main power supply 26 and its energizing coil 27 is connected in series with a power supply 28 and the branch chute micro-switches 23a and b.

In normal operation coil 27 is dead and switch 25 is in regular running position supplying power to contacts 28 and the device is placed in operation as described above. When either one of the micro-switches 23a or 23b is opened because of an excess of cans in its chute, therefore, in addition to stopping the air jet to that chute it closes a circuit supplying power to relay coil 27 which throws switch 25 to contacts 29. This cuts off the power supply to alternator 10 and supplies power directly to each of solenoid valves 6a and 6b through their respective chute micro-switches 23a and 23b. Of course, the chute in which there is an excess of cans will have its micro-switch open so that its corresponding air jet will be shut off and a continuous supply of air will flow from the opposite jet, thus diverting all cans to that corresponding chute.

When there is on overflow of an excessive number of cans in both chutes simultaneously, both micro-switches 23a and 23b operate, as seen also in FIG. 6. This operates to energize solenoid 30 which is in series with power source 26 and both micro-switches 23a and 23b. This operates to shut off the flow of all cans to divider chute 3 until the excess of cans in either or both chutes is disposed of and either or both micro-switches return to their opposite positions, thereby restoring either single or alternate operation as is required.

The operation of the cam stop or shut off gate is best understood by reference to FIG. 7. It comprises an air supply through line 5 to solenoid valve 30. The latter is energized when an overflow of cans in both branch chutes simultaneously causes the operation of both micro-switches 23 so as to complete a circuit which supplies it with power as described above. Air is thus admitted to diaphragm chamber 32 on which is positioned diaphragm 33 which is held in place by lock-nut 34. Plunger shaft 35, sliding in pedestal bearing 36, thus forces the shut-off gate 37, which is mounted on hinge 38, into the path of the moving cans in the opening 2 against the action of spring 39. The whole assembly is mounted on bracket 40 which in turn is fastened to the side of the frame of divider chute 3. Diaphragm chamber 32 may be vented or drained through valve 41. Solenoid 30 is equipped with an exhaust port which permits escape of air from the diaphragm chamber when the solenoid is de-energized upon restoration of flow in either of the branch chutes. This permits plunger 35 to return to normal position thereby opening gate 37 to restore the flow of cans to the process.

It is thus evident from the foregoing that my invention takes care of all flow conditions which may occur in a line consisting of a main feed conveyor and two branches. For example, when the flow in one of the branches supplying containers to a filling or other type of machine slows down because of a delay in supplying materials to it or stops completely for some reason, the supply of containers to that branch is temporarily stopped until normal conditions are again established when the flow to that branch is again resumed.

When the flow in both branches is slowed down or stopped simultaneously for some reason, the main supply is automatically cutoff until a demand arises for containers in either or both branches when the main supply is again restored and flow directed to either or both branches as required.

For normal operation, of course, my invention may be adjusted to divert the flow from one branch chute to the other at any rate or period desired, as for example to divert each can to an opposite chute or to permit as many as a dozen or more cans to flow into one branch chute before diverting the next batch to the opposite chute. This is done by varying the period or cyclical frequency of the alternator by adjusting the vent 13 and inlet valve 11.

While the above embodiment and description of operation applies to a layout having two branch chutes, it is obvious that my invention may be applied to any number of branch chutes without departing from its basic principles.

For example, my divider chute 3 may comprise a multiplicity of outlet openings and branch chutes disposed vertically above one another. Corresponding air jets would then be so located, directed, and synchronized as to divert containers to each of such openings as required in the manner described above.

Figure 2:
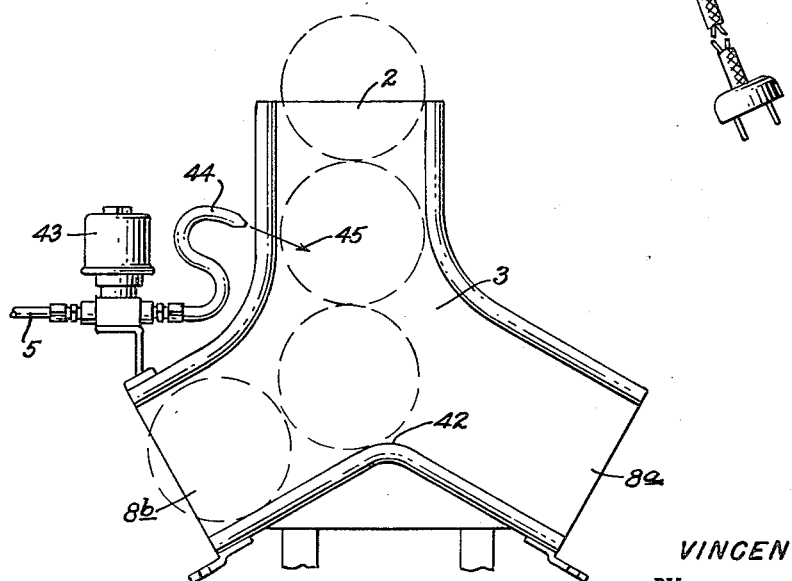
FIG. 2 is a perspective showing an alternate embodiment of my can divider chute arranged for single nozzle operation.

In the case of a two branch chute operation it is possible to operate my invention, though with less positive action, by means of only one air jet. This is the embodiment I have shown in FIG. 2. Here I make my divider chute 3 of offset construction and locate my lower divider guides 42 to one side of the vertical center line of the inlet opening or mouth 2. With no air jet in operation all cans will thus fall through the single opening towards 8b.

Solenoid valve 43 with nozzle 44 is located to provide an air jet 45 which diverts cans towards the branch chute 8a. This embodiment employs an alternator, can stop mechanism, and the other auxiliaries described above.

These air jet pulses are adjusted to direct cans periodically towards branch chute 8a as required. When there is an excessive flow in 8a the jet is stopped and all containers drop naturally towards 8b. When there is an excess in 8b the air jet operates continuously to divert all containers to 8a. To take care of a simultaneous excess in both branch chutes I employ a main stop gate similar to that described above for two nozzle operation.

I claim:

1. A can line distributor for cans having cylindrical surfaces comprising a divider chute, an inlet opening and a plurality of outlet openings; a feeder conveyor communicating with said inlet opening; branch conveyors communicating with each of said outlet openings; a plurality of air nozzles, each of said nozzles being positioned at said divider chute to direct a flat air stream across said inlet opening in the direction of one of said outlet openings and tangent to the advancing edge of said cylindrical surfaces; detector means positioned on each of said branch conveyors, said detector means being responsive to an excessive flow of cans in said branch conveyors; means associated with said nozzles for supply periodic successive pulses of air to said nozzles; means responsive to said detector means for stopping said pulses of air to each of said nozzles whereby pulses directed in the direction of any particular one of said outlet openings are stopped while there is an excessive flow of cans in the corresponding branch conveyor.

2. The apparatus of claim 1 in combination with stopping means for cutting off the flow of cans in said feed conveyor, said stopping means being responsive to said detector means positioned on each of said branch conveyors whereby the flow of cans in said feed conveyors is stopped while there is a simultaneous excessive flow of cans in all of said branch conveyors.

3. A can line diverter for cylindrical cans comprising an inverted Y-shaped divider chute, said divider chute comprising a vertical inlet opening adapted to receive said cans traveling in a radial direction, and two inclined outlet openings; a feeder conveyor communicating with said inlet opening; a first branch conveyor communicating with one of said outlet openings; a second branch conveyor communicating with the other of said outlet openings; a first electrical switch positioned in said first branch conveyor; a second electrical switch positioned in said second branch conveyor, said switches being responsive to an excessive flow of cans in said conveyors; a first solenoid valve operated air nozzle positioned on the first side of said vertical opening to direct a flat air stream across said inlet opening and towards said second branch conveyor; a second solenoid valve operated air nozzle positioned on the second side of said vertical opening to direct a flat air stream across said inlet opening and towards said first branch conveyor; an alternator switch for alternately energizing and de-energizing said solenoids at a predetermined frequency; means for connecting an electrical power supply between said switches, said solenoids and said alternator switch, whereby an excessive flow of cans in said first branch conveyor will stop the operation of said alternator switch while simultaneously providing a continuous air jet from said first solenoid-valve operated air nozzle, and whereby an excessive flow of cans in said second branch chute will stop the operation of said alternator switch while simultaneously providing a continuous air jet from said second solenoid-valve operated air nozzle, said alternator switch and said air nozzles resuming normal operation when said excessive flow of cans is eliminated.

4. The apparatus of claim 3 in combination with a solenoid operated shut off gate for cutting off the flow of cans in said feed conveyors, said solenoid being connected to an electrical power supply and to said electrical switches positioned on said branch conveyors, whereby a simultaneous excessive flow of cans in both of said branch conveyors will stop the flow of cans in said feed conveyor until said simultaneous excessive flow is eliminated.

5. A can line diverter for cylindrical cans comprising an inverted Y-shaped divider chute, said divider chute comprising a vertical inlet opening adapted to receive said cans traveling in a radial direction; a first inclined outlet opening and a second inclined outlet opening; a stationary guide positioned within said chute to direct the flow of all cans toward said first outlet opening; a feeder conveyor communicating with said inlet opening; a first branch conveyor and a second branch conveyor communicating with said corresponding outlet openings; an air nozzle positioned at said divider chute to direct a flat air stream across said inlet opening above said stationary guide and in the direction of said second outlet opening; detector means positioned on each of said branch conveyors, said detector means being responsive to an excessive flow of cans in said branch conveyors; means associated with said nozzle for supplying periodic pulses of air to said nozzle; means responsive to said detector means for stopping said pulses of air to said nozzle while there is an excessive flow of cans in said second branch conveyor; means responsive to said detector means for supplying a continuous flow of air from said nozzle while there is an excessive flow of cans in said first branch conveyor.

6. The apparatus of claim 5 in combination with stopping means for cutting off the flow of cans in said feeder conveyor, said stopping means being responsive to said detector means positioned on both of said branch conveyors whereby the flow of cans in said feed conveyor is stopped while there is a simultaneous excessive flow of cans in both of said branch conveyors.

References Cited by the Examiner

UNITED STATES PATENTS

| 1,420,936 | 6/22 | Morter | 193—31 |
|---|---|---|---|
| 1,735,825 | 11/29 | Koch | 193—31 |
| 2,372,813 | 4/45 | Darling | 121—148 |
| 2,405,829 | 8/46 | Hurley | 193—31 X |
| 2,570,923 | 10/51 | Dodge | 193—39 |
| 2,845,165 | 7/58 | Copping | 198—31.1 |
| 2,851,146 | 9/58 | Sherrill | 198—31 |
| 2,918,908 | 12/59 | Herner | 121—148 |
| 2,990,665 | 7/61 | Magnuson. | |

SAMUEL F. COLEMAN, *Primary Examiner.*

ANDRES H. NIELSEN, RALPH H. BRAUNER, ABRAHAM BERLIN, *Examiners.*